United States Patent [19]

DiForte

[11] Patent Number: 4,982,628
[45] Date of Patent: Jan. 8, 1991

[54] LUG NUT STORAGE ATTACHMENT FOR A POWER DRIVEN LUG NUT REMOVER

[76] Inventor: Mario P. DiForte, 3510 N. Wind Rd., P.O. Box 8537, Baltimore, Md. 21234

[21] Appl. No.: 384,433

[22] Filed: Jul. 25, 1989

[51] Int. Cl.$^5$ ............................................... B25B 13/02
[52] U.S. Cl. ...................................... 81/125; 81/177.4
[58] Field of Search ...................... 81/125, 177.4, 490, 81/180.1, 185.2, 185.1, 177.2

[56] References Cited

U.S. PATENT DOCUMENTS

| | | |
|---|---|---|
| 1,537,929 | 5/1925 | Lee . |
| 1,543,175 | 6/1925 | McCarthy . |
| 1,585,338 | 5/1926 | Fisher . |
| 1,756,003 | 4/1930 | North . |
| 2,416,882 | 3/1947 | Parizo . |
| 2,836,091 | 5/1958 | Mann . |
| 2,857,794 | 10/1958 | Red . |
| 2,869,410 | 1/1959 | Prichard ............................. 81/177.2 |
| 2,993,397 | 7/1961 | Albertson . |
| 3,005,367 | 10/1961 | Vose . |
| 3,416,395 | 12/1968 | Hanson . |

FOREIGN PATENT DOCUMENTS 659136 6/1929 France ................................. 81/125

Primary Examiner—D. S. Meislin
Attorney, Agent, or Firm—Shlesinger & Myers

[57] ABSTRACT

A lug nut storage attachment for a power driven lug nut remover which comprises a cylindrical member engaged, and rotatable with the lug nut remover, the cylindrical member having a storage chamber for receiving lug nuts. A portion of the cylindrical member engages the lug nut for loosening the same and has a passageway for conveying the lug nut to the storage chamber. The cylindrical member is provided with an opening through which the lug nuts may be removed from the storage chamber. A tubular member is in sleeved engagement with the cylindrical member, the tubular member being slidable longitudinally on the cylindrical member to a first position in covering engagement with the cylindrical member opening, and to a second position in which the opening is exposed to permit removal of the lug nuts from the storage chamber. Complemental locking members on the cylindrical and tubular members maintain the latter in covering engagement with the cylindrical member opening during operation of the lug nut.

18 Claims, 2 Drawing Sheets

4,982,628

LUG NUT STORAGE ATTACHMENT FOR A POWER DRIVEN LUG NUT REMOVER

BACKGROUND OF THE INVENTION

In the removal of wheels from vehicles, it is conventional practice to employ high speed power driven lug nut removers, which substantially facilitate and accelerate the removal of the lug nuts. However, this process is necessarily slow because, after each lug nut is removed from the wheel, it must be individually removed from the socket of the lug unit remover by hand before the process is repeated for the next lug nut.

Additionally, since there are usually five lug nuts holding each wheel in place, it is difficult to keep track of all of the lug nuts which have been removed, and this problem is multiplied when all wheels are removed from the vehicle. As a result, lug nuts are frequently lost and time must be taken to locate lug nuts which have not been placed together in a single location.

Attempts have been made to resolve this problem by means of attachments for power driven lug nut removers, as illustrated in U.S. Pat. Nos. 2,416,882, 1,756,003, and 2,993,397. However, these devices require multiple parts, are costly to manufacture, and/or are cumbersome to use.

SUMMARY OF THE INVENTION

This invention is a lug nut storage attachment for a power driven lug nut remover. The attachment includes a cylindrical member which is rotatably engaged with the shaft of a power driven lug nut remover. The cylindrical member includes a storage chamber for lug nuts for securing lug nuts and an opening in the wall of the cylindrical member for removing lug nuts therefrom. A tubular extension having a socket at the outer end thereof, engages a lug nut and a passageway extends from this socket to the storage chamber through which the lug nuts pass into the storage chamber.

A tubular member is in sleeved engagement with the cylindrical member and is longitudinally slidable with respect thereto, to selectively expose the cylindrical member to permit removal of lug nuts from the storage chamber or to cover the opening to retain the lug nuts in the storage chamber during operation of the lug nut remover.

Locking means are provided for retaining the tubular member in covering engagement with the cylindrical member opening during operation of the lug nut remover. The locking means comprise detent pins extending outwardly from the outer periphery of the cylindrical member, and an annular recess in the inner periphery of the tubular member with which the detent pins are engaged.

DESCRIPTION OF FORM OF THE INVENTION ILLUSTRATED IN FIGS. 1-5

Figure 1:
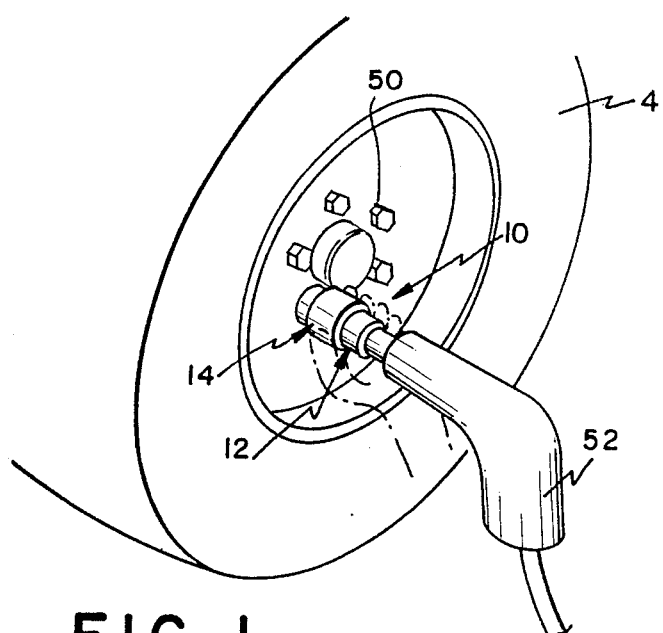
FIG. 1 is a perspective view of the lug nut storage attachment for a power driven lug nut remover of the present invention, illustrating its use.
Figure 4:
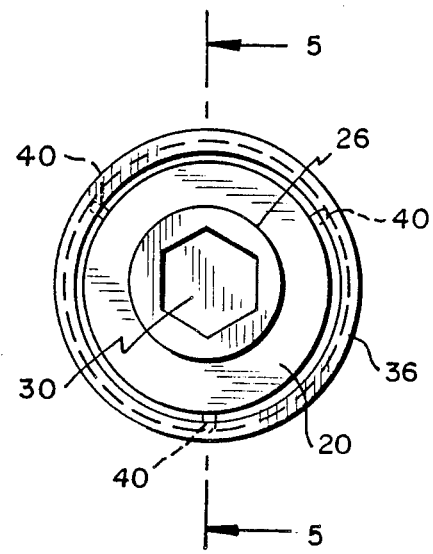
FIG. 4 is an end elevational view of the present invention.

In FIGS. 1 to 5, there is illustrated a lug nut storage attachment which includes an inner cylindrical member 12 and an outer sleeve 14 in engagement therewith.

Inner cylindrical member 12 includes a tubular wall 16, a rear end wall 18 and a front end wall 20, which form an inner lug nut storage chamber 22, therebetween.

Rear end wall 18 is provided with an opening 24 which is centrally located therein along the longitudinal axis of inner cylindrical member 12, the size and shape of which complements that of the rotating shaft of a conventional power driven lug nut remover.

Front end wall 20 is provided with a tubular extension 26 projecting outwardly from cylindrical member 16 along the longitudinal axis of inner cylindrical member 12, which extension is provided with a passageway 28 which is in communication with lug nut storage chamber 22. The outer end of passageway 26 terminates in a socket 30 of hexagonal shape for engagement with the hexagonal lug nuts of the wheel. The attachment of the present invention may be made in two different sizes, one with a socket size of 13/16th inches and the ¾ inches for fitting the lug nuts of american cars. Other size sockets may of course be provided as required for other sized lug nuts.

Figure 3:
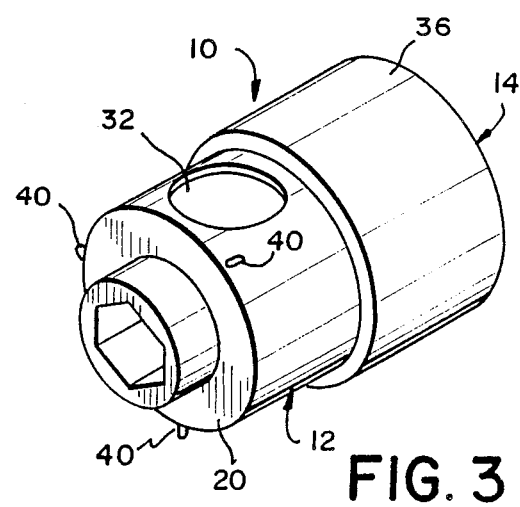
FIG. 3 is a view similar to FIG. 2, showing the invention in open position.
Figure 5:
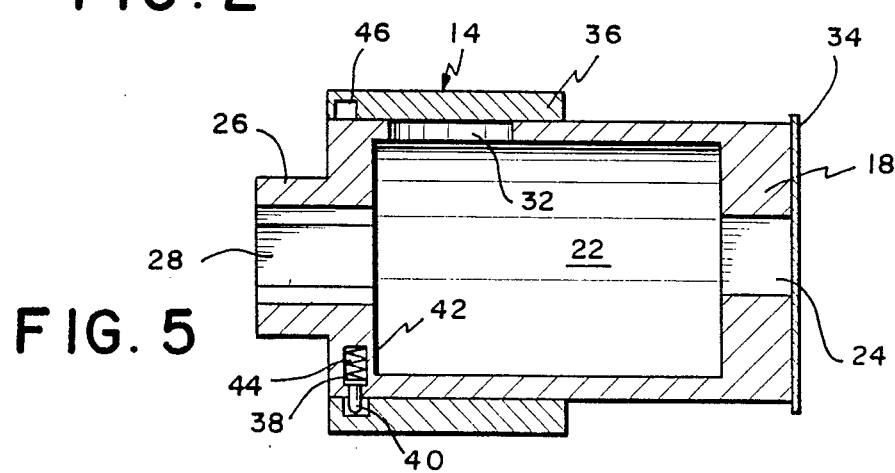
FIG. 5 is a sectional view taken along lines 5—5 of FIG. 4, looking in the direction of the arrows.

As shown in FIGS. 3 and 5, tubular wall 16 is provided with a circular opening 32 which is located near the front of the inner cylindrical member adjacent end wall 20 through which lug nuts stored in chamber 22 may be removed from the attachment.

The outer periphery of inner cylindrical member 12 is provided with a circular flange forming an abutment 34 to limit the longitudinal movement of outer sleeve 14.

Outer sleeve 14 comprises a tubular member 36, the inner diameter of which is substantially the same as the outer diameter of tubular wall 16 so that tubular member 36 is in contiguous slidable engagement with the outer periphery of tubular wall 16.

Figure 2:
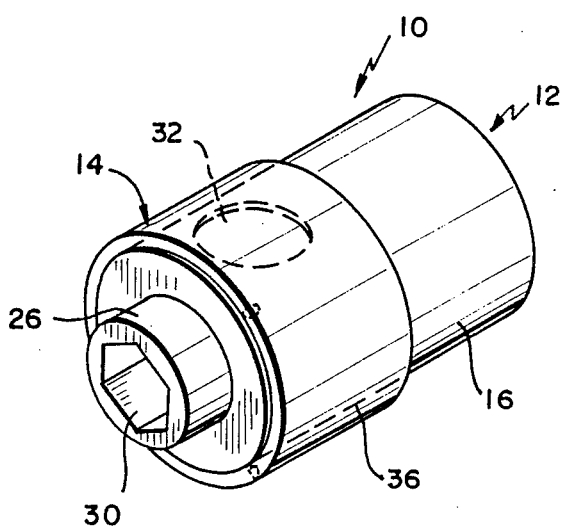
FIG. 2 is a perspective view thereof showing the attachment in closed position.

It will be further noted from the drawings that outer sleeve 14 is substantially half the length of inner cylindrical member 12, so that the entire inner periphery of outer sleeve 14 is in constant engagement with the outer surface of inner cylindrical member 12 when the sleeve is slid longitudinally of the inner cylindrical member from the closed position shown in FIG. 2 to the open position shown in FIG. 3.

It is a salient feature of the present invention to provide a locking member generally designated 38 for maintaining outer sleeve 14 in covering relation with opening 32 of inner cylindrical member 12 to prevent accidental removal of the lug nuts from storage chamber 22 during operation of the lug nut remover. Locking member 38 includes a plurality of spaced detent pins 40 positioned in recesses 42 in the outer periphery of tubular wall 16 of cylindrical member 12. Pins 40 are urged outwardly beyond the periphery of tubular wall 16 by coil springs 44 located in recesses 42 and engageable with the inner ends of pins 40.

Locking member 38 further includes an annular recess 46 formed in the inner periphery of outer sleeve 14 adjacent one end thereof, which recess is adapted to receive pins 40 when outer sleeve 14 is moved into covering engagement with opening 32 of inner cylindrical member 12. This arrangement enables to outer sleeve 14 and inner cylindrical member 12 to be maintained in locking engagement with each other, while permitting relative rotation of inner cylindrical member 12 with respect to outer sleeve 14. This arrangement further enables the detent pin 40 to be disengaged from annular recess 46 upon exertion of a force on outer sleeve 14 rearwardly of inner cylindrical member 12.

OPERATION

In FIG. 1, there is illustrated a vehicle wheel 48 having a plurality of lug nuts 50 engageable therewith securing the wheel to the vehicle.

In accordance with the objects of the present invention, a conventional power driven lug nut remover 52 having a rotating shaft 54, is engaged with the attachment of the present invention by insertion of shaft 54 into opening 24 of the present device. As indicated in FIG. 1, outer sleeve 14 is held by one hand of the operator of the lug nut remover so that, when shaft 54 is actuated, the inner cylindrical member 12 is rotated relative to outer sleeve 14, and socket 30 which is engaged with lug nut 50, effects removal of the lug nut from the wheel.

During this time, detent pins 40 are lockingly engaged in annular recess 46, as shown in FIGS. 2 and 5 in order to maintain outer sleeve 14 in covering relation with opening 32.

As each lug nut is removed, it moves through passageway 28 in tubular extension 26 and drops into storage chamber 22 where it remains until it is desired to remove lug nuts from the attachment. In this connection, it is noted that the present attachment is preferably made of a size that will permit the twenty lug nuts from all four wheel of the vehicle to be stored in storage chamber 22.

After the lug nuts are removed from the wheel or wheels, outer sleeve 14 is slid rearwardly of inner cylindrical member 12 until it abuts circular flange 34, at which time the attachment is in the position shown in FIG. 3, with opening 32 exposed. The lug nuts may then be quickly and easily removed from storage chamber 22 through opening 32.

DESCRIPTION OF FORM OF THE INVENTION AS ILLUSTRATED IN FIGS. 6 AND 7

Figure 6:
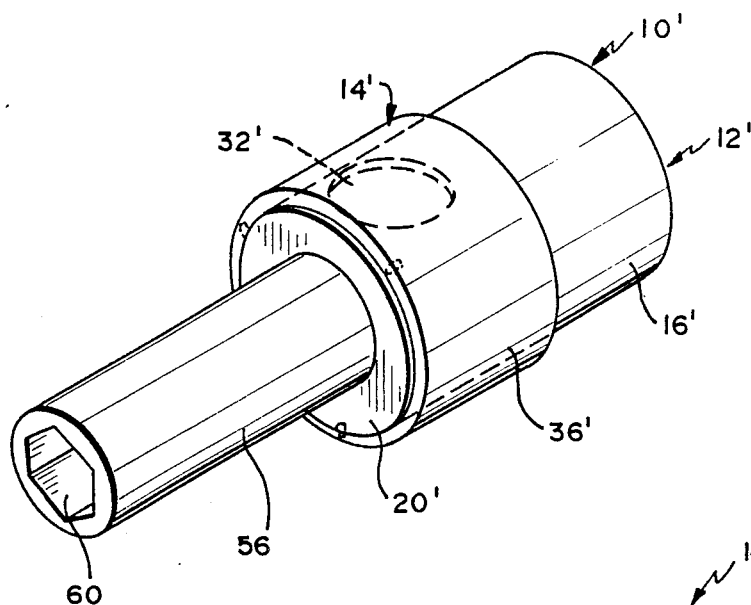
FIG. 6 is a perspective view of a modified form of storage attachments of the present invention.
Figure 7:
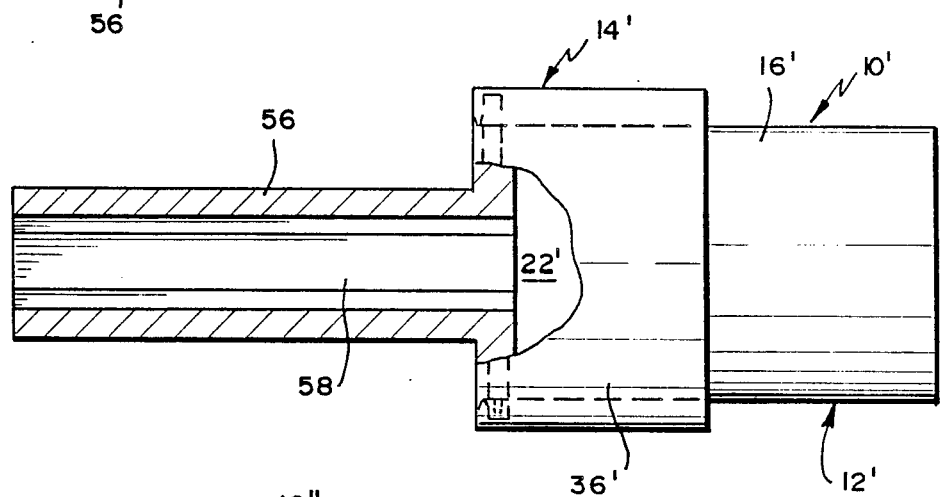
FIG. 7 is a side elevational view of the invention as illustrated in FIG. 6, a portion thereof being broken away to disclose details of construction.

In FIGS. 6 and 7, there is illustrated a modified form of lug nuts storage attachment constructed in accordance with the present invention wherein parts thereof which ar similar to the form of invention illustrated in FIGS. 1 to 5 are identified by like, primed numbers.

In this form of invention, however, an elongated tubular extension 56 extends outwardly from inner cylindrical member 12' thereby forming an elongated passageway 58 extending completely through elongated tubular extension 56, and terminating at the outer end thereof in a hexagonal socket 60 adapted for complemental engagement with lug nut 50.

This form of the invention is particularly adapted for use with trucks or other vehicles in which the lug nuts are recessed in a well which would not permit engagement with the attachment illustrated in FIGS. 1 to 5.

The operation of the lug nut remover having storage attachment 10' connected therewith is the same as set out above in connection with the lug nut storage attachment of FIGS. 1 to 5.

DESCRIPTION OF FORM OF INVENTION ILLUSTRATED IN FIGS. 8 AND 9

Figure 8:
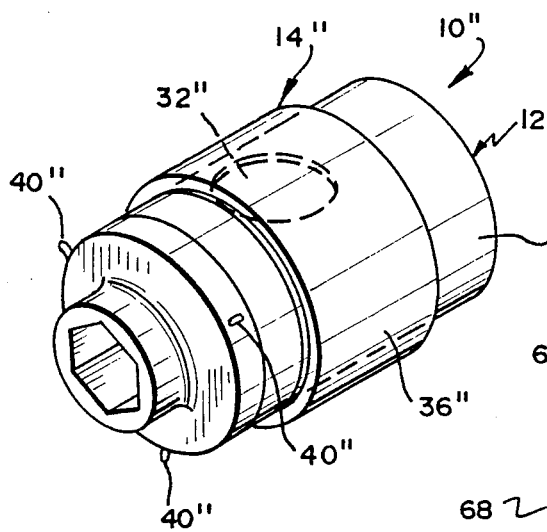
FIG. 8 is a perspective view of another modified form of the present invention.
Figure 9:
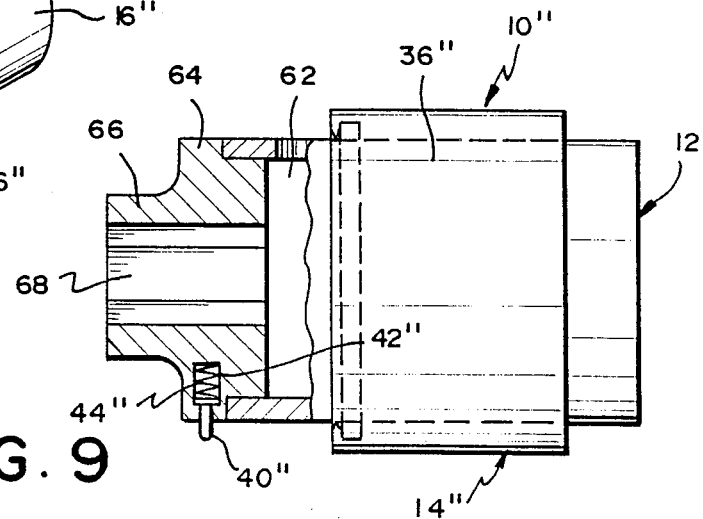
FIG. 9 is a side elevational view of the form of invention illustrated in FIG. 8, a portion thereof being broken away to disclose details of construction.

In FIGS. 8 and 9, there is illustrated another modified form of the present invention wherein portions thereof are similar to the form of invention illustrated in FIGS. 1 to 5, and are identified by like, double primed numbers.

In this form of the invention, the forward end wall of cylindrical member 12" includes a inner portion 62 of reduced diameter, and an outer portion 64 which is of the same diameter as tubular wall 16", thereby permitting reduced inner portion 62 to be inserted into, and frictionally engaged with, the inner surface of tubular wall 16". The end of tubular wall 16" abuts outer portion 64 of the end wall, as shown in FIG. 9.

A tubular extension 66 extends outwardly from the end wall of cylindrical member 12" and is provided with a passageway 68, the outer end of which forms a lug nut-engaging socket 68.

By virtue of this arrangement, the end wall of the cylindrical member may be removed and replaced by a similar member having a different sized socket. In this way, the same attachment of the present invention may be modified for use with 13/16th inches and ¾ inch lug nuts.

The storage attachment of the present invention may be made of any suitable material, but is preferably made of a moldered plastic such as LEXAN 101 polycarbonate for maximum strength and light weight. This enables the attachment to be manufactured economically and, due to its relatively small size, is not cumbersome to hold during repeated operation over a period of time. The present arrangement further enables the attachment to be moved from open to closed position with a minimum of effort by sliding the tubular sleeve longitudinally of the inner cylindrical member and, during operation, the noise of the lug nuts within the storage chamber is reduced to a minimum by virtue of the fact that the centrifugal force exerted on the lug nuts by rotation of inner cylindrical member 12' prevents movement thereof during operation of the lug nut remover.

While there has been herein shown and described the presently preferred forms of the present invention, it is to be understood that this has been done for purposes of illustration only, and that various changes may be made therein within the scope of the appended claims.

What is claimed is:

1. A lug nut storage attachment for a power driven lug nut remover having a rotatable shaft, said attachment including:
   (a) a first member concentrically mounted on said shaft and rotatable therewith;
   (b) said first member having a chamber for storing lug nuts;
   (c) a portion of said first member being adapted for engagement with a lug nut and provided with a passageway to carry the lug nut to the storage chamber;

(d) said first member having an opening in communication with the storage chamber to permit removal of lug nuts therefrom;

(e) a second member concentrically mounted on, and in sleeved engagement throughout its length with a portion of the outer surface of said first member; and (f) said second member being slidable on the outer surface of said first member to a first position to cover the first member opening during operation of the lug nut remover, and to expose this opening when slid to a second position to permit removal of lug nuts from the storage chambers of the first member.

2. The lug nut storage attachments of claim 1, with the addition of:

(a) locking means for maintaining said second member in covering engagement with the opening of the first member when the lug nut remover is being operated.

3. The lug nut storage attachment of claim 2, wherein:

(a) said locking means includes complemental locking members on the outer surface of said first member and the inner surface of said second member.

4. A lug nut storage attachment for a power driven lug nut remover having a rotatable shaft, said attachment including:

(a) a first member having a storage chamber for receiving lug nuts;

(b) said first member being concentrically mounted on said shaft and including a first end operatively engaged with the lug nut remover shaft and rotatable therewith;

(c) said first member having a second end adapted to engage a lug nut to loosen the same upon actuation of the lug nut remover;

(d) said second end having a passageway through which removed lug nuts may pass to the storage chamber;

(e) said first member having an opening through which lug nuts may be removed from the storage chamber;

(f) a second member concentrically mounted on, and in sleeved engagement throughout its length with said first member; and (g) said second member being slidable longitudinally on said first member from a first position in covering engagement with the first member opening to a second position exposing the opening to permit removal of lug nuts from the storage chamber.

5. The lug nut storage attachment of claim 4, wherein:

(a) said first member is of cylindrical shape.

6. The lug nut storage attachment of claim 5, wherein:

(a) said second member is of tubular shape; and, (b) said first member is rotatable relative to said second member.

7. The lug nut storage attachment of claim 4, with the addition of:

(a) means for maintaining said second member in covering relation with the opening of said first member when the lug nut remover is being operated.

8. The lug nut storage attachment of claim 7, wherein:

(a) said means includes complemental locking members on the outer surface of said first member and the inner surface of said second member.

9. The lug nut storage attachment of claim 4, wherein:

(a) said second end of said first member is removable to permit selective engagement of another end adapted for engagement with a different sized lug nut.

10. The lug nut storage attachment of claim 4, wherein:

(a) said second end is elongated for engagement with lug nuts in vehicle wheels having deep wells.

11. A lug nut storage attachment for a power driven lug nut remover having a rotatable shaft, said attachment including:

(a) a cylindrical member concentrically mounted on said shaft comprising a tubular side wall and end walls, forming a lug nut storage chamber therebetween;

(b) one of said end walls having an axial opening engageable with the lug nut remover rotatable shaft;

(c) the other of said end walls having a tubular portion extending axially therefrom, and providing a passageway for lug nuts to said storage chamber;

(d) the outer end of said tubular portion having a complemental socket for engaging a lug nut;

(e) the wall of said cylindrical member having an opening through which lug nuts may be removed therefrom;

(f) a tubular member concentrically mounted on, and in sleeved engagement throughout its length with said cylindrical member; and (g) said tubular member being selectively moved to a position in covering engagement with the opening of said cylindrical member and to a position to expose the opening to permit removal of lug nuts from the storage chamber.

12. The lug nut storage attachment of claim 11, wherein:

(a) said cylindrical member is rotatable relative to said tubular member.

13. The lug nut storage attachment of claim 12, with the addition of:

(a) means for maintaining said tubular member in covering relation with the opening of said first member when the lug nut remover is being operated.

14. The lug nut storage attachment of claim 13, wherein:

(a) said means includes complemental locking members on the outer periphery of said cylindrical member and the inner periphery of said tubular member.

15. The lug nut storage attachment of claim 14, wherein:

(a) said complemental members include an annular recess in the inner periphery of said tubular member; and (b) at least one detent pin extending outwardly from the tubular wall of said cylindrical member into the annular recess to prevent relative longitudinal movement of said cylindrical and tubular members.

16. The lug nut storage attachment of claim 15, with the addition of:

(a) a plurality of detent pins in spaced relation along the outer periphery of said cylindrical member for detachable engagement with the annular recess of said tubular member.

17. The lug nut storage attachment of claim 11, wherein:

(a) the other of said end walls and tubular portion of said cylindrical member is removably engaged with said tubular side wall.

18. The lug nut storage attachment of claim 11, wherein:

(a) said tubular portion extending from the other of said end walls is elongated for engagement with lug nuts in vehicle wheels having deep wells.

* * * * *